Oct. 31, 1939.    L. BECHEREAU    2,177,798
AIRFOIL USED IN AERONAUTICS
Filed Oct. 27, 1937    5 Sheets-Sheet 1
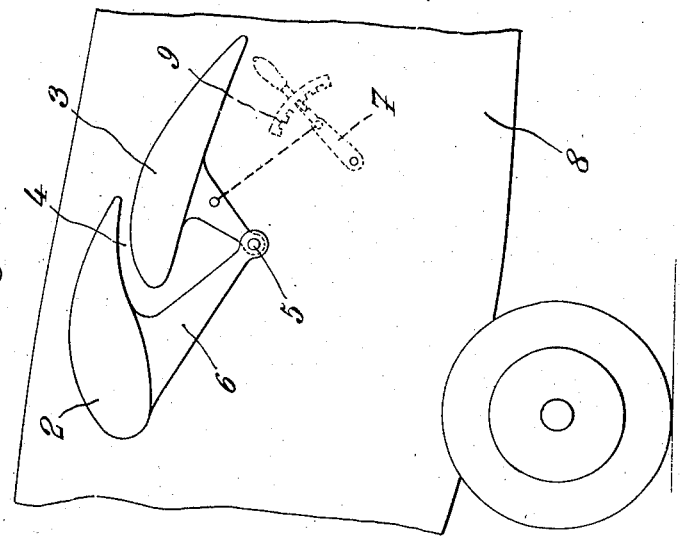
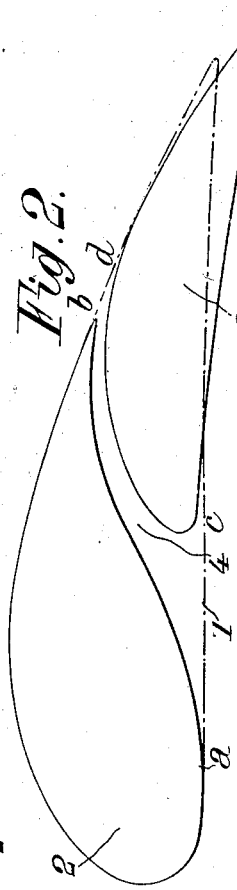
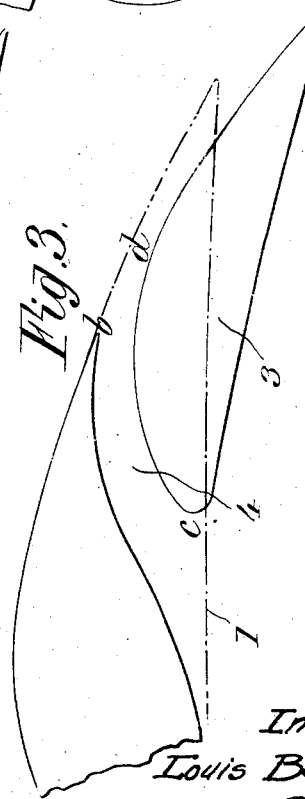
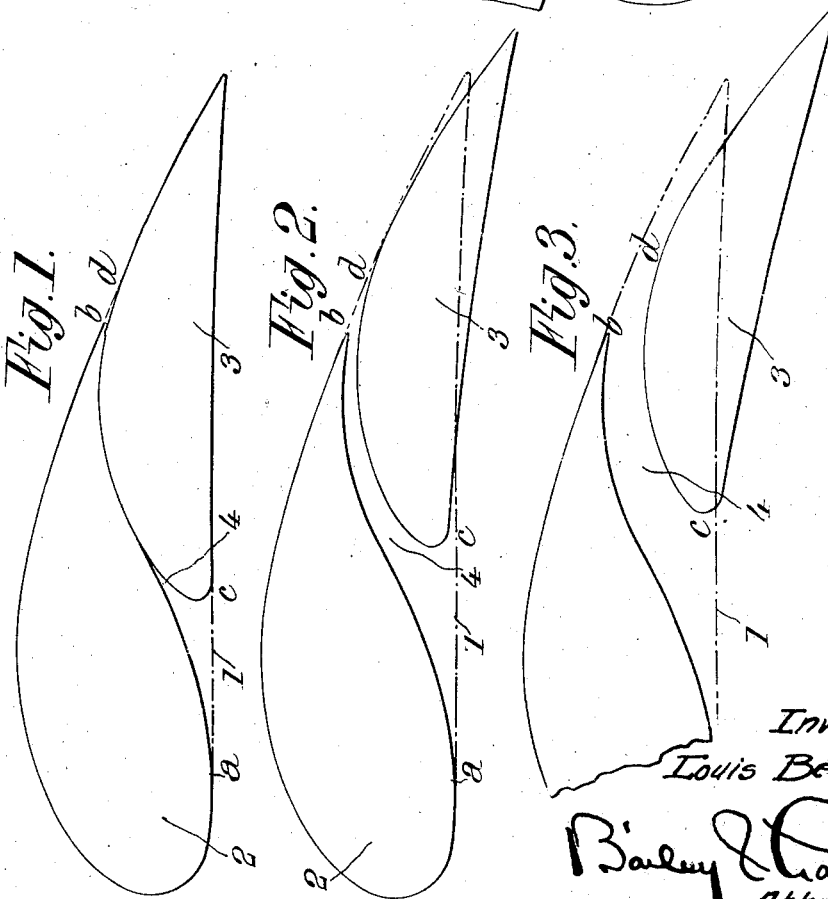
Inventor:
Louis Bechereau,
Bailey & Carson
Attorneys Oct. 31, 1939.  L. BECHEREAU  2,177,798
AIRFOIL USED IN AERONAUTICS
Filed Oct. 27, 1937  5 Sheets-Sheet 2
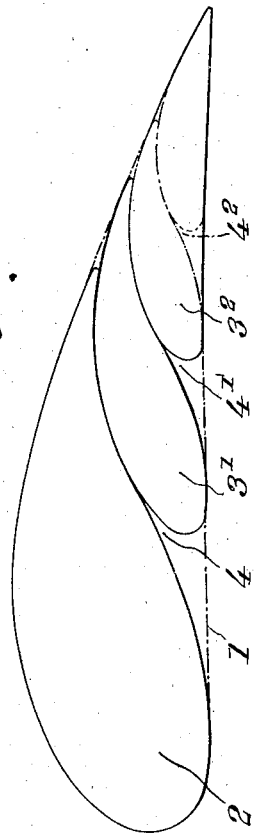
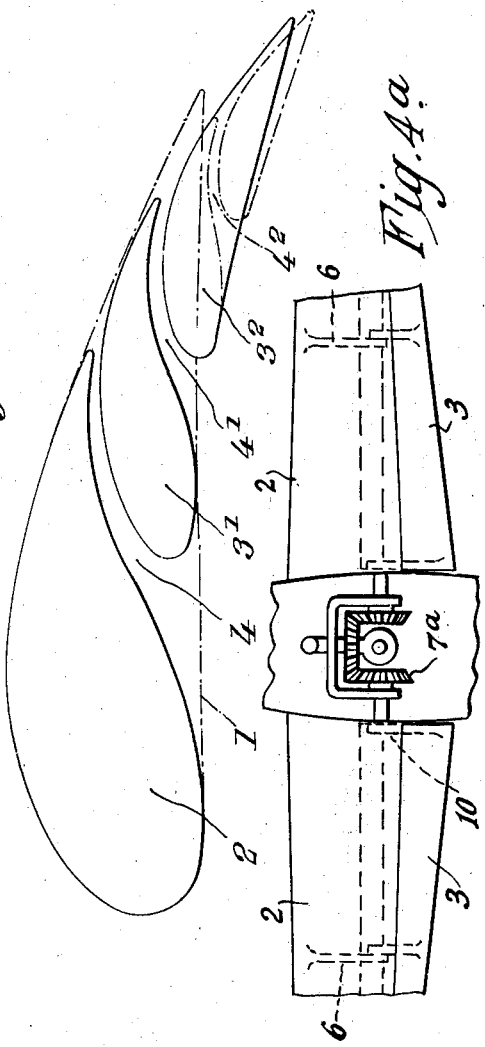
Inventor:
Louis Bechereau,
Attorneys Inventor:
Louis Bechereau,
Attorneys Oct. 31, 1939.  L. BECHEREAU  2,177,798
AIRFOIL USED IN AERONAUTICS
Filed Oct. 27, 1937   5 Sheets-Sheet 4

Inventor:
Louis Bechereau,
Attorneys

Oct. 31, 1939.    L. BECHEREAU    2,177,798
AIRFOIL USED IN AERONAUTICS
Filed Oct. 27, 1937    5 Sheets-Sheet 5
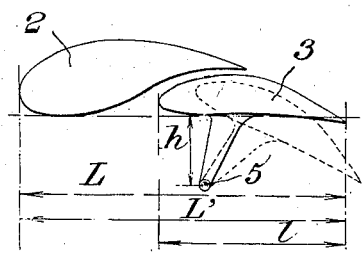
Fig.14
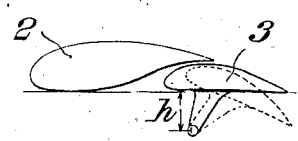
Fig.15
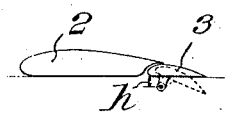
Fig.16
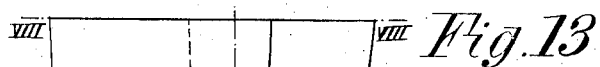
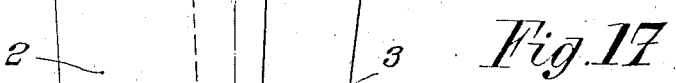
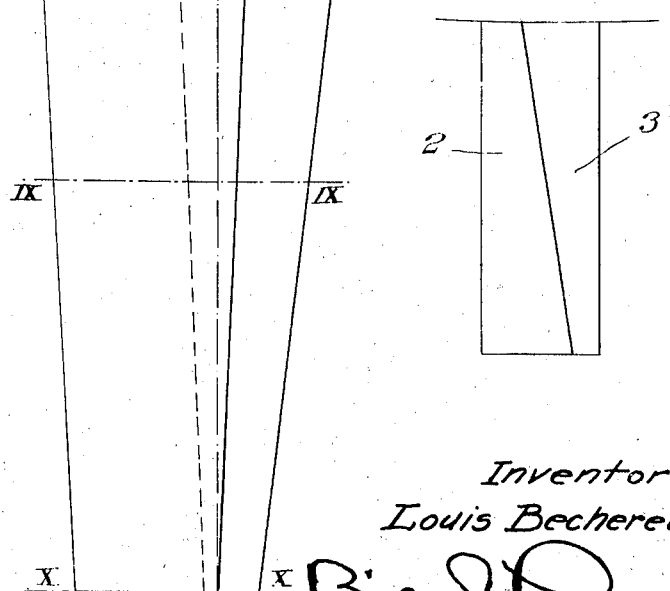
Fig.13
Fig.17
Inventor:
Louis Bechereau,
Bailey & Carson
Attorneys Patented Oct. 31, 1939

2,177,798

UNITED STATES PATENT OFFICE 2,177,798

AIRFOIL USED IN AERONAUTICS

Louis Bechereau, Paris, France

Application October 27, 1937, Serial No. 171,367
In Belgium October 29, 1936

13 Claims. (Cl. 244—42)

The present invention relates to supporting surfaces of variably curvature and area for aircrafts.

The object of the present invention is to provide wings or other supporting surfaces of this kind the size of which has been greatly reduced and the lift increasing properties of which have been greatly improved.

With these and other objects in view, one essential feature of the present invention consists in constituting such supporting surfaces in the form of composite or slide wings including at least two elementary wings adapted to be either juxtaposed to each other so that the whole is substantially equivalent to a single wing (hereinafter called "mother wing"), or set apart from each other so as to clear the slot existing between them, with, preferably, a variation of their respective incidences, each of said wing elements having an important relative chord with respect to that of the section of the mother wing, say 50 or 60 per cent in the case of a composite wing including two wing elements.

Another feature of the present invention, which relates more especially to the case in which there are to be more than two wing elements, consists in first dividing the mother wing into two wing elements, as above explained, then in dividing the rear wing element into two parts according to the same principle, and so on, in such manner as finally to obtain a multiple wing the elements of which are of an importance which decreases from front to rear, the front wing element being made sufficiently big and strong for being able to support, at least partly, the other wing elements.

A third feature of the present invention consists in connecting the wing elements through mechanisms adapted to be actuated by the pilot and arranged in such manner that the wing elements can be moved toward, or away from, each other, with varying relative inclinations, so that the whole constitutes a multiple and expansible wing of variable incidence and curvature.

Still another feature of the present invention consists in combining with composite wings of the type above mentioned, and especially those in which the wing elements are movable with respect to one another in a pivoting manner, means for ensuring or facilitating the clearing of the slot existing between two adjacent elements during the opening movement.

According to an embodiment of the invention, these means consist in the provision, in the parts of the sections of the wing elements that are located close to one another in the folded position of the whole, recesses or hollows which ensure the flow of the air stream through the slot as soon as the wing elements are being moved apart.

According to another embodiment, these parts of the wing elements are provided with movable noses which are automatically operated, when the slot is opened, in such manner as to clear the passage therethrough.

According to still another feature of the present invention, which is particularly advantageous in the case of trapezoidal wings or triangular wings, but is not limited to these cases, the wind structure including at least two wing elements is made in such manner that the relative chord length of the rear wing element decreases gradually toward the tip of the wing, in such manner that, in the central part, that is to say near the fuselage, the whole structure constitutes a composite slide wing as above described, whereas, close to the tip of the wing, the rear wing element plays the part of a mere wing flap.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatic cross section of a supporting element or airfoil made according to a first embodiment of the invention, the parts being shown in the closed position;

Figs. 2 and 3 are similar views of the same airfoil, with the parts shown in two characteristic positions, respectively, corresponding to the opening of the composite wing;

Fig. 4 is a diagrammatic vertical view of the same composite wing mounted on the fuselage of an airplane.

Fig. 4a is a partial plan view of an airplane showing a mechanism for operating movable wing elements on opposite sides of the fuselage.

Fig. 5 is a view similar to Fig. 1, showing another embodiment of the invention;

Fig. 6 is another view of the embodiment of Fig. 5, showing the parts in different relative positions;

Fig. 13 is a plan view of a trapezoidal wing made according to the invention;

Fig. 14 is a section on the line 14—14 of Fig. 13;

Fig. 15 is a section on the line 15—15 of Fig. 13;

Fig. 16 is a section on the line 16—16 of Fig. 13;

Fig. 17 is a diagrammatical view illustrating the application of a feature of the invention to the case of a rectangular wing.

Figure 7:
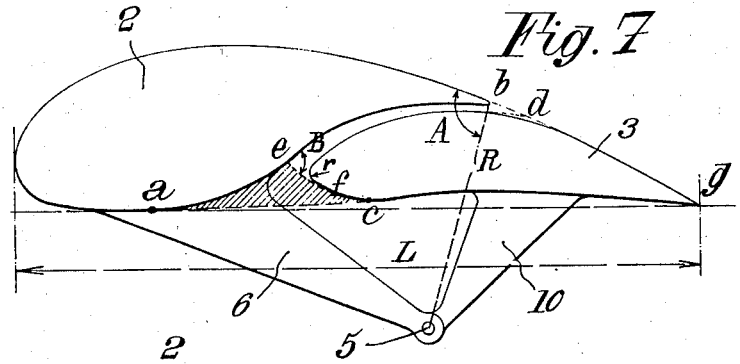
Fig. 7 is a cross section view similar to Fig. 1, illustrating another embodiment of the present invention.

In the following description, it will be supposed that the invention is applied to the case of an airplane wing, which is to be made of variable curvature and area.

In order to determine the longitudinal cross section of the supporting system according to the present invention, I start from an airfoil section 1, preferably of a shape corresponding to a thick wing, that is to say with a relative thickness of 25% or even more, this airfoil corresponding to the "mother wing" above referred to. Some parts of this mother wing are shown in dash-and-dot lines in Figs. 1 to 3 and Figs. 5 and 6.

To the embodiment illustrated by Figs. 1 to 4, this airfoil section is divided into two portions limited by two curved lines $ab$ and $cd$, which, in Fig. 1 are in contact with each other along most of their length and which are jointed at $a$ and $c$ to the under side of the wing and at $b$ and $d$ to the upper side through suitable fillets.

The mother wing is thus divided into two portions 2 and 3, which are separated from each other by an elongated slot 4 the slant of which with respect to a horizontal line is relatively important, say 20°. The wall of slot 4 which corresponds to the underside of the front portion 2 is given the shape of an elongated S which is tangentially joined to the front of the under side of the mother wing (point $a$) and ends tangentially to the upper side of said mother wing, near the last third thereof (point $b$), where the air streams might tear off from said upper in the example that is being considered.

The section of the front wing element 2 is an airfoil section of a shape analogous to those called "Royer aerofoil sections" in the "Bulletin Technique" of the French Aeronautics Technical Department, No. 25, February 1925.

The rear airfoil element 3 is given the shape of a supporting wing section inscribed as well as possible in the portion of the mother wing section to which it corresponds.

According to the present invention, the chord length $l$ of each of these portions 2 and 3 is relatively important with respect to the chord length of the mother wing 1, being for instance at least 50%, and preferably about 60% thereof.

The shapes of portions 2 and 3, having thus been determined, I build wing elements 2 and 3 in the usual manner, account being taken of the technical and aeronautical conditions to be complied with.

The front wing element 2 may be permanently fixed to the fuselage 8, and the rear wing element 3 is mounted either on the front wing element 2 or partly thereon and partly on the fuselage in such manner that it can be displaced with respect to element 2 and that the width of slot 4 can be modified at will by the pilot.

The connecting mechanism to be provided between wing elements 2 and 3 is made in such manner that the moving apart of the rear element is accompanied by a downward inclination of the trailing portion thereof, which simultaneously modifies the incidence, the curvature and the area of the wing structure. Care should be taken that the increase of the width of slot 4 corresponds to the increase of the incidence.

In the embodiment illustrated by Fig. 4, the supports of the rear wing element 3 consist of pivots 5 carried by arms 6 themselves carried by the front wing element 2, and I act upon said rear wing element through a suitable control device, for instance a lever 7 cooperating with stop notches 9 which permit of securing this rear wing element 3 in any given position.

The rear wing element can also be divided into two independent parts, located respectively on either side of the fuselage as shown in Fig. 4a. In this case, the pilot can operate these independent parts with means conventional in the art as through differential controls 7a, enabling him to act at will on either of these parts or on both of them at the same time so as to obtain their displacement in the manner above indicated. He can thus modify the longitudinal and transverse equilibrium of the airplane.

Besides, the control may be arranged in such manner that, in the position of flight corresponding to the minimum incidence, slot 4 is not fully closed, thus leaving the possibility of displacing the rear wing element upwardly from said minimum incidence position of flight, so that the respective wing elements on either side of the fuselage can be moved simultaneously in opposite directions, for the transverse control of the airplane.

I might also connect the rear wing element 3, or the independent parts which constitute it, to the control stick of the airplane, in such manner that they can be used as elevator control elements.

When the rear wing element is successively fixed in several different characteristic positions the airplane can fly under different incidence conditions respectively. On the contrary, when both wing elements 2 and 3 are brought back into contact with each other, the whole structure is restored into a state corresponding substantially to the mother wing, and the slot effect is practically eliminated.

In the preceding description, it has been supposed that the wing structure included only two wing elements, to wit 2 and 3, obtained by dividing the mother wing into two portions. However, I may also, as shown by Figs. 5 and 6, divide the mother wing into a greater number of elements, the construction and form of each of them being based upon the same principles as above set forth.

In order to determine the sections of the wing elements, I first divide the mother wing into two portions, as above explained with reference to Figs. 1 to 4. Then I divide the rear element into two portions according to the same method, which gives the sections of the wing elements $3^1$ and $3^2$ (Figs. 5 and 6) leaving between them a slot $4^1$ the shape of which is analogous to that of the slot 4 above described. If it is desired further to increase the number of wing elements, it is possible to divide wing element $3^2$ into two elements separated from each other by slot 4², as shown in dotted lines in Figs. 5 and 6, and so on until the desired number of wing elements has been obtained.

In this manner, I obtain a multiple wing the elements of which are all, with the exception of the last one, similar to the "Royer" airfoil sections above mentioned, while the last one has any suitable supporting airfoil section. The airfoil sections corresponding to the various wing elements are thus placed behind one another, two adjacent sections overlapping each other and leaving between them a slot of adjustable width.

The front wing element 2 is always made sufficiently large and strong for being able to support, at least partly, the other wing element or elements. Furthermore, I provide between the different wing elements connecting means such that it is possible to obtain their relative displacement through a suitable control, as above explained.

It should be noted that the front wing element 2, instead of being secured to the fuselage, might be made movable with respect thereto, the other wing element or elements being always movably supported by said front element 2.

As above explained, and as illustrated by Fig. 7, the two parts may be so arranged that in the normal flying position (corresponding to the wing structure being substantially equivalent to the mother wing) there is a relatively small slot between the trailing edge of the front wing element and the upper side of the rear wing element, at bd. These afford several advantages, and, in particular, when the two parts of the rear wing element located on either side of the fuselage respectively are made independent it permits of ensuring the transverse control of the airplane by moving one of these parts in one direction and the other in the opposite direction.

According to an important feature of the present invention, the means for moving the rear wing element away from the front wing element are preferably so devised as to bring the curvilinear arc corresponding to the section of the upper side of the rear wing element in line with the arc corresponding to the same section of the front wing element, which ensures the best possible efficiency of the composite wing according to the invention.

As above explained, an advantageous manner of ensuring this displacement consists in pivoting the rear wing element with respect to the front wing element about an axis 5. Preferably, as shown by Fig. 7, this axis 5 is located under the trailing edge of the front wing element, preferably in a plane passing through said edge and substantially normal to the curve of the upper surface of the front wing element (angle A equal to about 90°). Furthermore, this axis or shaft 5, which is connected to wing elements 2 and 3 by arms 6 and 10, should be at a distance R from said trailing edge as short as possible.

Such an arrangement permits of obtaining a considerable curvature of the wing structure without very much varying the total chord length (L' in Fig. 8) from the minimum chord length L corresponding to the mother wing airfoil section.

Furthermore, it is always advantageous, for constructional reasons, to reduce distance R as much as possible. It seems that the best value of said distance R should range from one-fourth to two-thirds of the above mentioned chord length L.

Besides, it is possible further to reduce this distance R by making use of the arrangements which will now be described.

According to an important feature of the present invention, the parts of the sections that are adjacent to the slot are made in such manner that they permit of ensuring the correct clearing of the slot when wing elements 2 and 3 are displaced with respect to each other in such manner as to produce the desired variation of the wing curvature.

For instance, according to one of the embodiments that can be employed, the parts aeb and cfd of the sections are so shaped that they produce, between the wing elements and in the position of flight, a slot the cross section of which increases from the upper side to the under side of the mother wing section.

Figure 8:
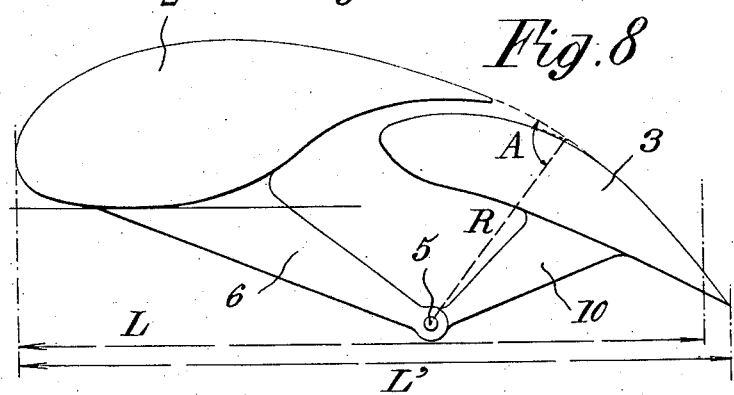
Fig. 8 is a view similar to Fig. 7, showing the parts in a different relative position.

Such a result can be obtained by providing a suitable clearance on the upper side of the rear wing element with respect to the section set forth in Fig. 1. For instance, as shown by Figs. 7 and 8, the section aeb of the under side of the front wing element is given the S shape above mentioned. The underside of the rear wing element preferably has an upwardly curved front portion cf which comes as close as possible to the under side aeb of the front wing element, being preferably substantially at right angles thereto (angle B averaging 90° in Fig. 7). This part cf is joined to the upper side through a curved of suitable radius of curvature r.

Figure 9:
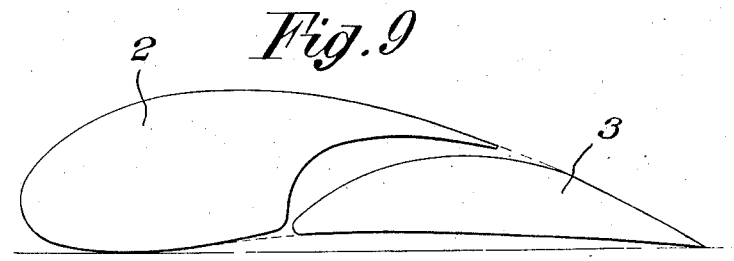
Fig. 9 is a cross section view similar to Fig. 1, illustrating still another embodiment of the invention.
Figure 10:
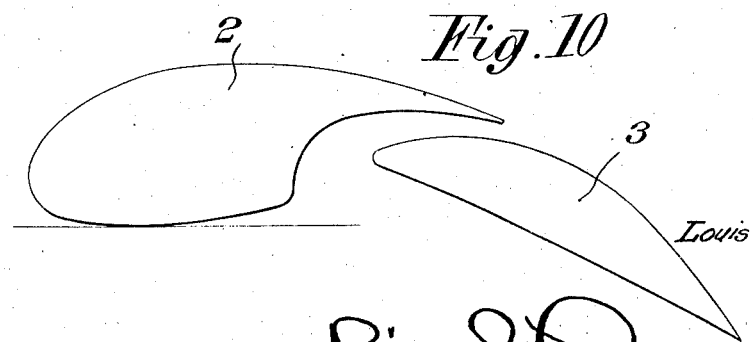
Fig. 10 is a view similar to Fig. 9 showing the same structure with a different relative position of the parts.

The desired result can also be obtained by hollowing along eb the underside of the front wing element as shown by Figs. 9 and 10. This portion is therefore more concave than in the embodiments above described. In this case, it is possible to restore the continuous outline of the underside of the mother wing 1 nearly wholly, although this is not at all necessary.

Figure 11:
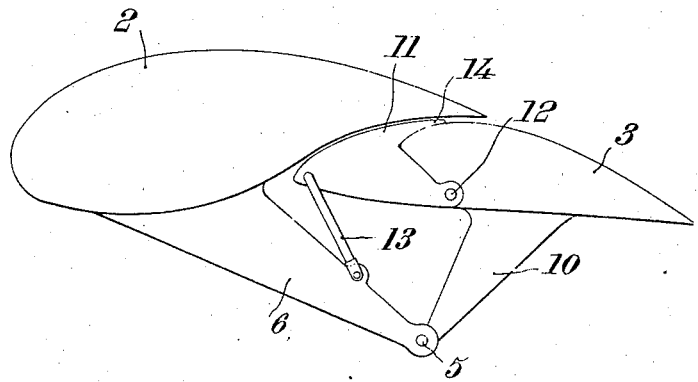
Fig. 11 is a cross section view analogous to Fig. 1 showing still another embodiment of the present invention.
Figure 12:
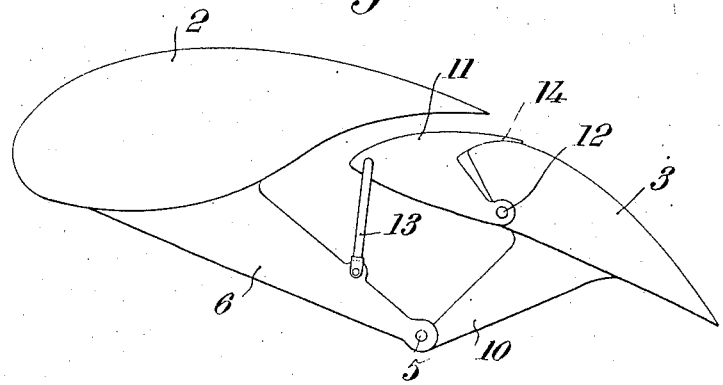
Fig. 12 is a similar view of the structure of Fig. 11 showing another relative position of the parts.

I may also, as shown by Figs. 11 and 12, provide at least one of the wing elements 2 and 3, preferably the rear wing element 3, with at least one movable part, adapted to be automatically displaced as a function of the relative displacements of the two wing elements and in such manner as to clear the slot. For instance, nose part 11, of a suitable section for permitting this, is provided at the front part of the rear wing element, being for instance pivoted to said rear wing element at 12. A covering surface 14 ensures the continuity of the upper side of wind element 3. Such a system permits of obtaining, in position of flight, if so desired, the continuity of the upper side outline, as well as of the underside outline of the mother wing.

The automatic control of the movement of nose part 11 is obtained through kinematic means, such as a connecting rod 13 mounted between arm 6 and the front portion of said nose part 11.

According to another feature of the present invention, which is chiefly, but not exclusively, applicable to trapezoidal or triangular wings, the wing structure includes two wing elements and the rear wing element is arranged in such manner that its relative chord length is variable, decreasing toward the tip of the wing.

Supposing always that the wing structure that is considered is an airplane wing, this variation is so arranged that the relative chord length of the rear wing element close to the fore and aft axis of the aircraft is sufficient for affording to the whole system the properties of a variable curvature wing as above described, and that, near the tips, the rear wing elements correspond to a mere wing flap.

Of course, such an arrangement can be applied, according to the present invention, to either of the two following cases:

(a) There is a single wing element 3, extending from wing tip to wing tip on both sides of the fore and aft axis of the airplane, and in this case, this wing element 3 can be actuated by means for controlling the variation of the curvature or of the lift increase;

(b) There are two half wing elements disposed respectively on either side of said fore and aft axis, and these half wing elements are controlled at will, through kinematic means with a differential mechanism of any type known in the art, either from lift increase control means or from the control stick, in which latter case, said wing elements can be pivoted in opposite directions (for transverse control) or even both in the same direction (for altitude control);

(c) There is a single central wing element adapted to be operated from a lift increase variation control, and two lateral wing elements or ailerons, adapted to be operated from the control stick.

In the drawings (Figs. 13 to 16 inclusive), I have diagrammatically shown one of the two trapezoidal wings of an airplane.

Where the wing is fixed to the airplane fuselage (on the upper side of Fig. 13), the sections of the wing elements 2 and 3 are chosen in accordance with the principles above set forth. For instance, the thickness of the structure is about from 20 to 30% of the chord length L of the section of the mother wing, whereas the chord length l of the wing elements, at least for wing element 3, is at least 50% of said length L.

Near the wing tip, the thickness is only from 10 to 15%, and the chord length (of element 3) from 20 to 30%.

Concerning the intermediate sections, it is advantageous to so choose them that the whole of the wing is generated by rectilinear generatrices, said wing being then of conical shape.

Finally, in order to obtain the relative displacements of the wing elements, I find it is still preferable to make use of the arrangement above described, which consists in effecting the pivoting about an axis such as 5. Of course, if there is only one wing element 3, there is only one axis 5.

The position of this axis 5 can easily be determined. Its distance $h$ from the under side of the mother wing will be chosen, near the fuselage, in accordance with the conditions above set forth. At the tip of the wing its value is much smaller, as in known arrangements of wing flaps.

It should be well understood that the above arrangement is not limited to the case of trapezoidal or triangle wings, but could also apply to rectangular wings, as diagrammatically shown by Fig. 17.

By thus providing at least two wing elements 3, corresponding to the two halves of the mother wings located on either side of the fore and aft axis of the airplane and by actuating them through a differential control permitting both lift increase and transverse control (eventually altitude control), all precautions being taken in order to ensure a good mechanical resistance of the whole, especially concerning the stresses on arms 6 and 10, I can obtain a wing structure, of variable slot, curvature, and incidence, the total chord length of which can be but little influenced by the deformation and which is very rigid, especially concerning torsional strength (R being low), the whole being particularly simple to manufacture.

In particular, a trapezoidal wing structure, of conical shape according to the invention, is capable of ensuring a greater difference between the maximum and minimum speeds than a wing structure of the usual trapezoidal type, as a consequence of the gradual and proper variation of the sections of the wing elements along the span.

In a general manner, while I have, in the above description, disclosed what I deem to be practical and efficient embodiments of the present invention, it should be well understood that I do not wish to be limited thereto, as there might be changes made in the arrangement, disposition, and form of the parts without departing from the principle of the present invention as comprehended within the scope of the accompanying claims.

What I claim is:

1. An air plane wing including half wings disposed on opposite sides of a fuselage, each half wing comprising a front and a rear element together forming a mother wing tapered from the fuselage to the wing tips, and means mounting said front and rear element for movement with respect to each other on a radius of curvature adapted to give an increasing lift effect to the wing, which effect decreases from the fuselage to the wing tip as the elements are separated.

2. An airplane wing as in claim 1, said means comprising an axis pivotally supporting said front and rear element, said axis being convergent to said wing half from said fuselage to said wing tip.

3. An airplane wing including half wings disposed on opposite sides of a fuselage, each half wing comprising a front element and a rear element movable with respect to said front element to form a slot therebetween, said front and rear element together forming a mother wing tapering from a thickness of at least 20% of the chord of the mother wing adjacent the fuselage to a thickness of at least 10% of the chord of the mother wing adjacent the wing tip, and means mounting said front and rear element for movement to form a slot therebetween adapted to cause an increasing lift effect to the wing, which effect decreases from the fuselage to the wing tip.

4. An airplane wing as in claim 3, said rear element having a chord at least 50% of the chord of the mother wing adjacent the fuselage and being tapered to the wing tip to a chord at least 20% of the chord of the mother wing.

5. An airplane wing as in claim 3, each wing half being tapered from a thickness ranging from 20% to 30% of the chord of the mother wing adjacent the fuselage with the rear element having a chord at least 50% of the chord of the mother wing, to a thickness adjacent the wing tip ranging from 10% to 15% of the chord of the mother wing with the rear element having a chord ranging from 20% to 30% of the chord of the mother wing.

6. An airplane wing including half wings disposed on opposite sides of the fuselage, each half wing comprising a front element and a rear element spaced in a normal nested position to form a slot therebetween, and means mounting said front and rear elements for upward or downward movement from said normal nested position with respect to each other on a radius of curvature adapted to give a greater lifting increasing effect adjacent the fuselage and an aileron effect adjacent the wing tip.

7. An airplane wing including half wings disposed on opposite sides of a fuselage, each half wing comprising a front element tapered from the fuselage to the wing tip, a rear element having a greater thickness taper and a less chord taper than the front element from the fuselage to the wing tip, and means mounting said rear element for movement on a curve having a decreasing radius of curvature from the fuselage to the wing tip.

8. An airplane wing including half wings disposed on opposite sides of a fuselage, each half wing comprising a front element and a rear element, and means mounting said rear element on an axis in a plane substantially normal to the curve of the upper wing surface at the trailing edge of said front element, said axis being convergent with said wing from the fuselage to the wing tip.

9. An airplane wing as in claim 1, said means comprising an axis convergent from the fuselage to the wing tip, and said axis being positioned in a plane substantially normal to the curve of the upper wing surface of the trailing edge of the front element.

10. A wing comprising a front element, a rear element, means for moving at least one element to open and close a slot between the front and rear element, and means mounted upon said rear element for movement with respect to both elements for filling or opening said slot, respectively when said elements are moved toward or away from each other.

11. A wing as in claim 10, said mounted means comprising a nose member pivotally secured to the leading edge of said rear element, and means for moving said member in response to movement of said rear element.

12. An airplane wing as in claim 1, means mounted upon said rear element for filling between said front and said rear element when the elements are in closed position, and for opening a slot between said front and rear element when the elements are separated.

13. An airplane wing including half wings disposed on opposite sides of the fuselage, each half wing comprising a front element and a rear element spaced in a normal nested position to form a slot therebetween, means mounting said front and rear elements for upward or downward movement from said normal nested position with respect to each other on a radius of curvature adapted to give a greater lifting increasing effect adjacent the fuselage, and means for selectively moving said rear elements either in the same direction for varying only the lifting increasing effect, or in opposite directions for obtaining with the lifting increasing effect an aileron effect at the wing tips.

LOUIS BECHEREAU.